United States Patent [19]

Conway

[11] Patent Number: 4,594,155
[45] Date of Patent: Jun. 10, 1986

[54] IMMISCIBLE FLUID SEPARATION APPARATUS

[76] Inventor: Charles S. Conway, Featherbed La., New Vernon, N.J. 07976

[21] Appl. No.: 640,234

[22] Filed: Aug. 13, 1984

Related U.S. Application Data

[63] Continuation of Ser. No. 433,286, Oct. 7, 1982, abandoned, which is a continuation-in-part of Ser. No. 370,111, Apr. 20, 1982, abandoned.

[51] Int. Cl.$^4$ .............................................. B01D 23/26
[52] U.S. Cl. ...................................... 210/115; 210/521; 210/522; 210/533
[58] Field of Search ...................... 210/532.1, 534, 536, 210/540, 187, 101, 110, 115, 800, 802, 521, 522, 703, DIG. 5, 109; 55/176

[56] References Cited

U.S. PATENT DOCUMENTS

| | | | |
|---|---|---|---|
| 365,259 | 6/1887 | Ide | 210/95 |
| 405,047 | 6/1889 | Newsome | 210/536 |
| 554,598 | 2/1896 | Gilmore | 53/176 |
| 597,258 | 1/1898 | Bovee | 55/176 |
| 654,965 | 7/1900 | Franke | 210/95 |
| 757,448 | 4/1904 | Friesdorf | 210/187 |
| 774,577 | 11/1904 | Gaskill | 210/537 |
| 802,243 | 10/1905 | Sturner | 210/537 |
| 835,216 | 11/1906 | Crozier | 210/540 |
| 1,005,977 | 10/1911 | Jones | 210/522 |
| 1,123,128 | 12/1914 | Kelly, Jr. | 210/187 |
| 1,159,044 | 11/1915 | Kelly, Jr. | 210/199 |
| 1,188,159 | 6/1916 | Dittrick | 210/540 |
| 1,240,081 | 9/1917 | Moss | 210/536 |
| 1,249,749 | 11/1917 | Hannagan | 210/258 |
| 1,351,155 | 8/1920 | Brown | 210/703 |
| 1,574,157 | 2/1926 | Knight et al. | 210/187 |
| 1,614,074 | 1/1927 | Lenz et al. | 210/522 |
| 1,627,569 | 5/1927 | Massicks | 210/537 |
| 1,716,934 | 6/1929 | Smith | 210/187 |
| 2,025,883 | 12/1935 | Mobley | 210/115 |
| 2,083,861 | 6/1937 | Padgett | 210/536 |
| 2,203,718 | 6/1940 | Burch | 210/774 |
| 2,342,950 | 2/1944 | Lovelady et al. | 210/187 |
| 2,808,933 | 10/1957 | Mobley | 210/532.1 |
| 3,297,537 | 1/1967 | Natland | 210/187 |
| 3,688,904 | 9/1972 | Knepp | 210/534 |
| 4,077,881 | 3/1978 | Snell | 210/800 |

FOREIGN PATENT DOCUMENTS

| | | | |
|---|---|---|---|
| 540361 | 4/1957 | Canada | 210/532.2 |
| 12994 | of 1900 | United Kingdom | 210/532.1 |

Primary Examiner—Richard V. Fisher
Assistant Examiner—Wanda L. Millard
Attorney, Agent, or Firm—Kenyon & Kenyon

[57] ABSTRACT

A fluid separator for separating a mixture of at least two immiscible fluids having different specific gravities. A fluid intake conduit is coupled to an enclosed separation chamber for admitting the mixture of fluids to the chamber, and a first vertically disposed elongated column extends into the chamber and opens adjacent the bottom thereof. A second column extends vertically upwardly from the chamber at a distance above the upper end of the first column which is approximately equal to $H(S_w/S_c-1)$, where H is the height of the first column between its vertically upper and lower ends, $S_w$ represents the specific gravity of the immiscible fluid having the greater specific gravity, and $S_c$ represents the specific gravity of the other fluid of the mixture. The chamber may also be divided into a plurality of individual separating sections to permit the simultaneous separation of a plurality of fluid mixtures.

21 Claims, 10 Drawing Figures

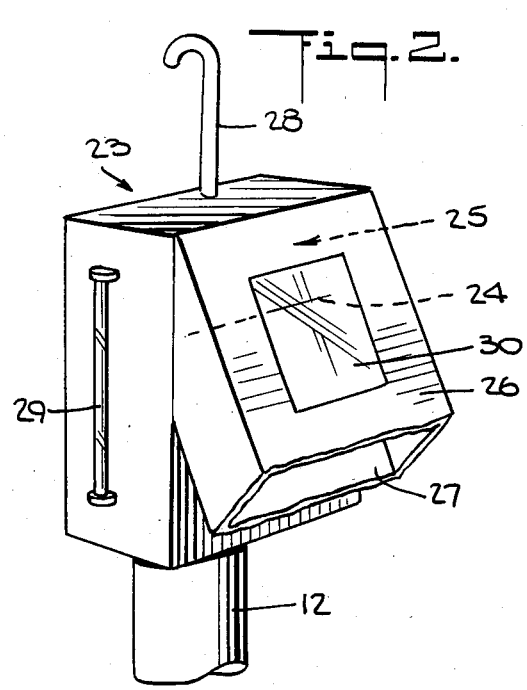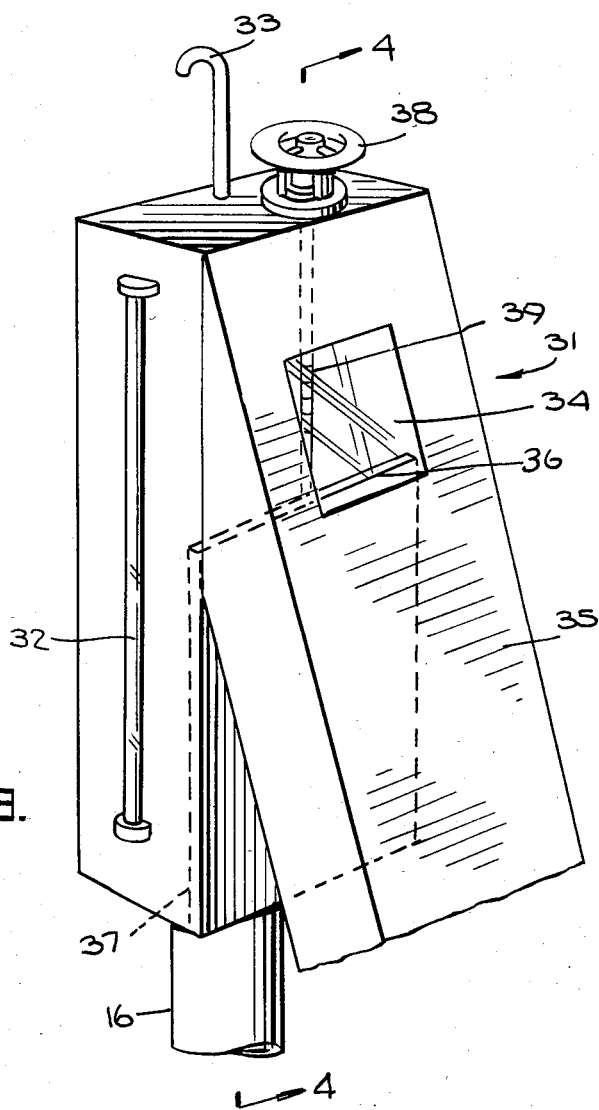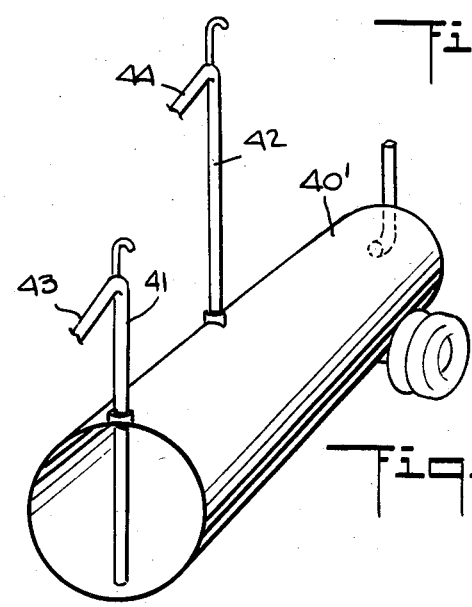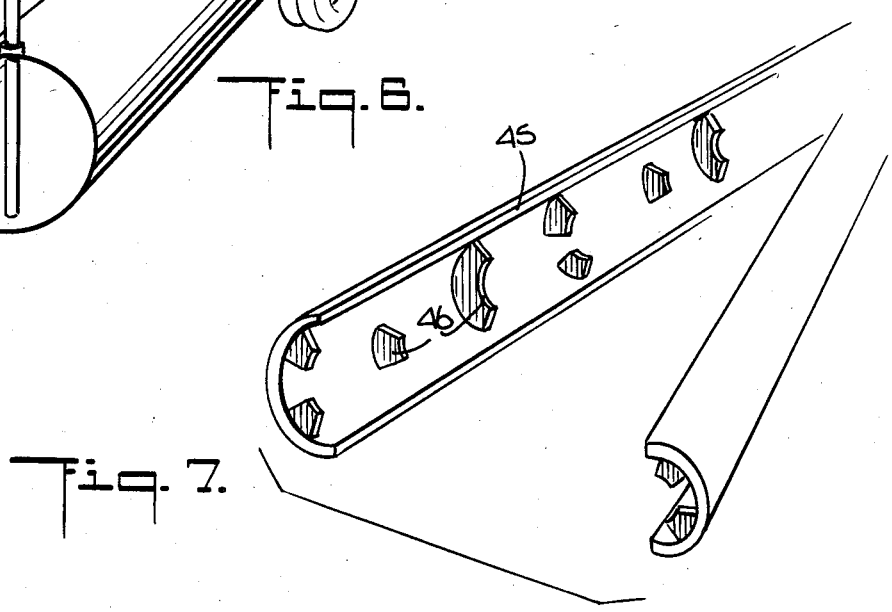

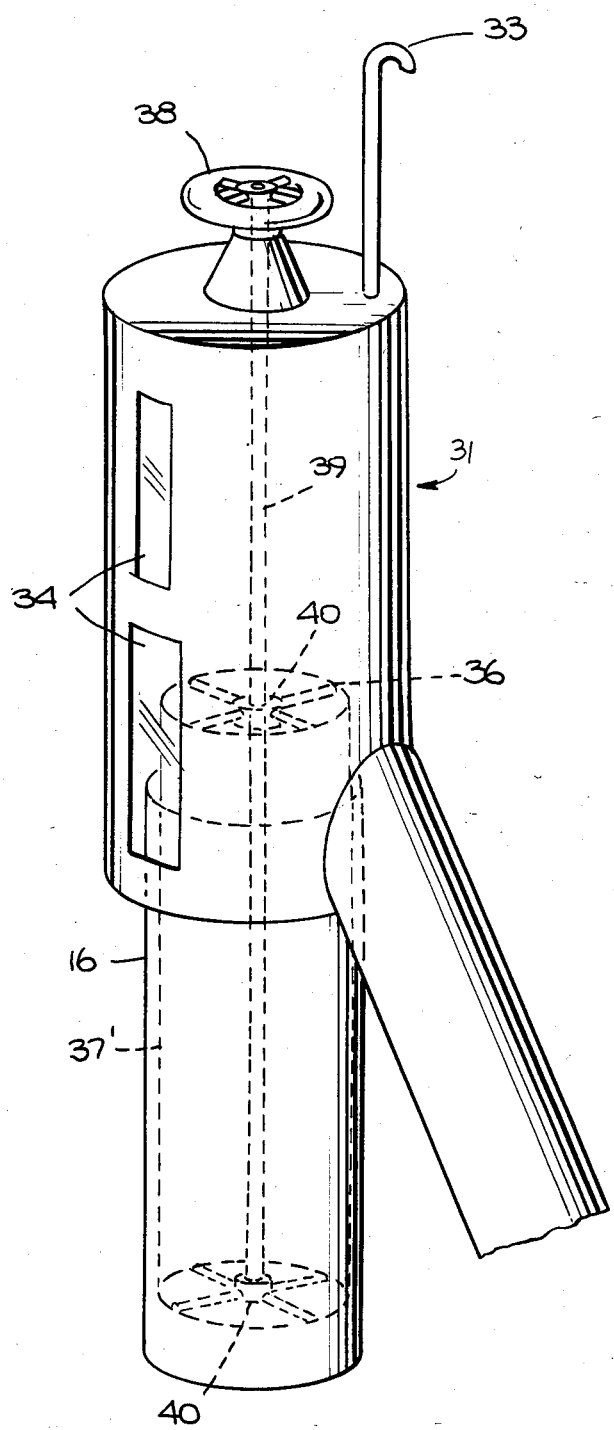

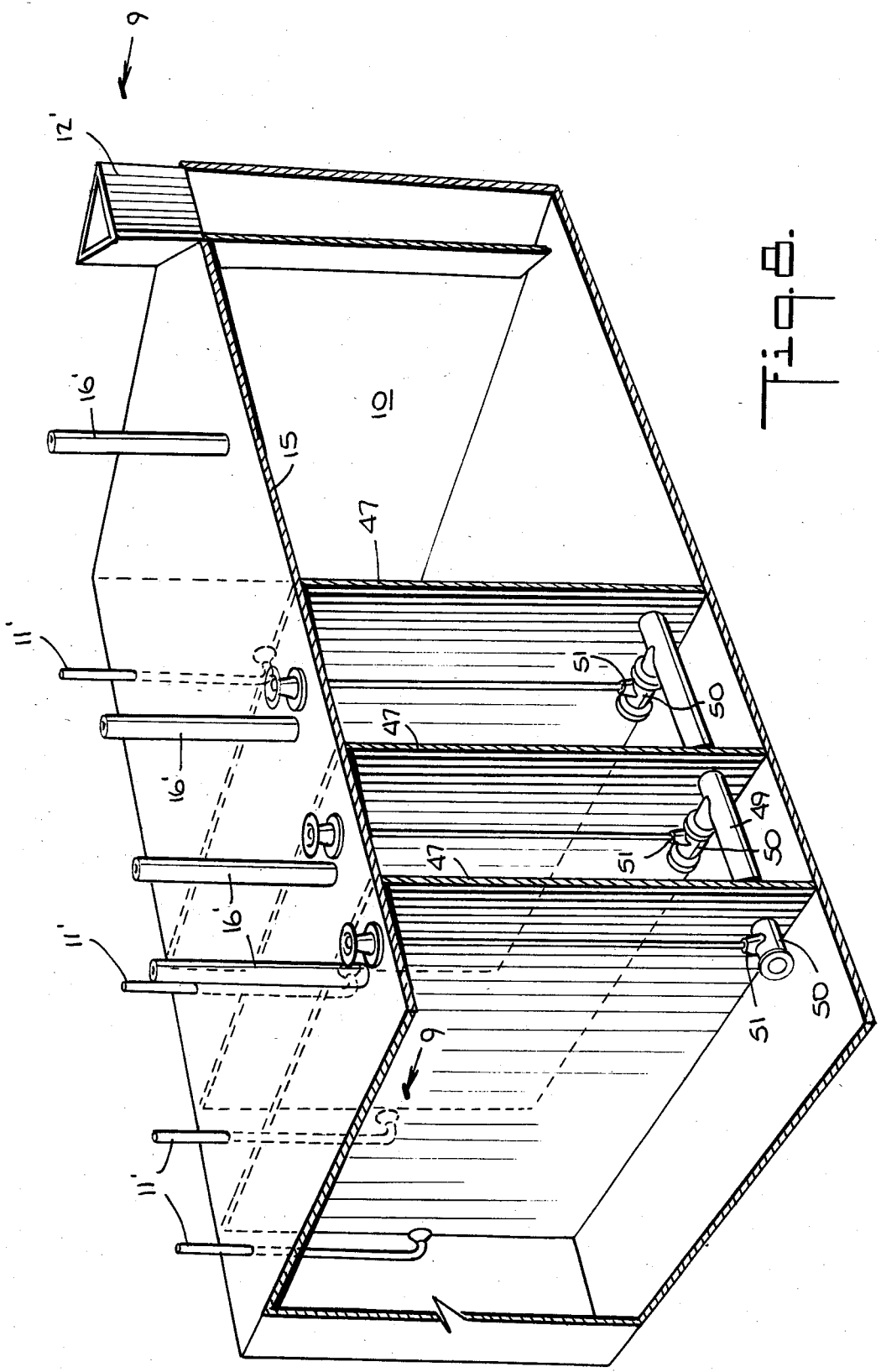

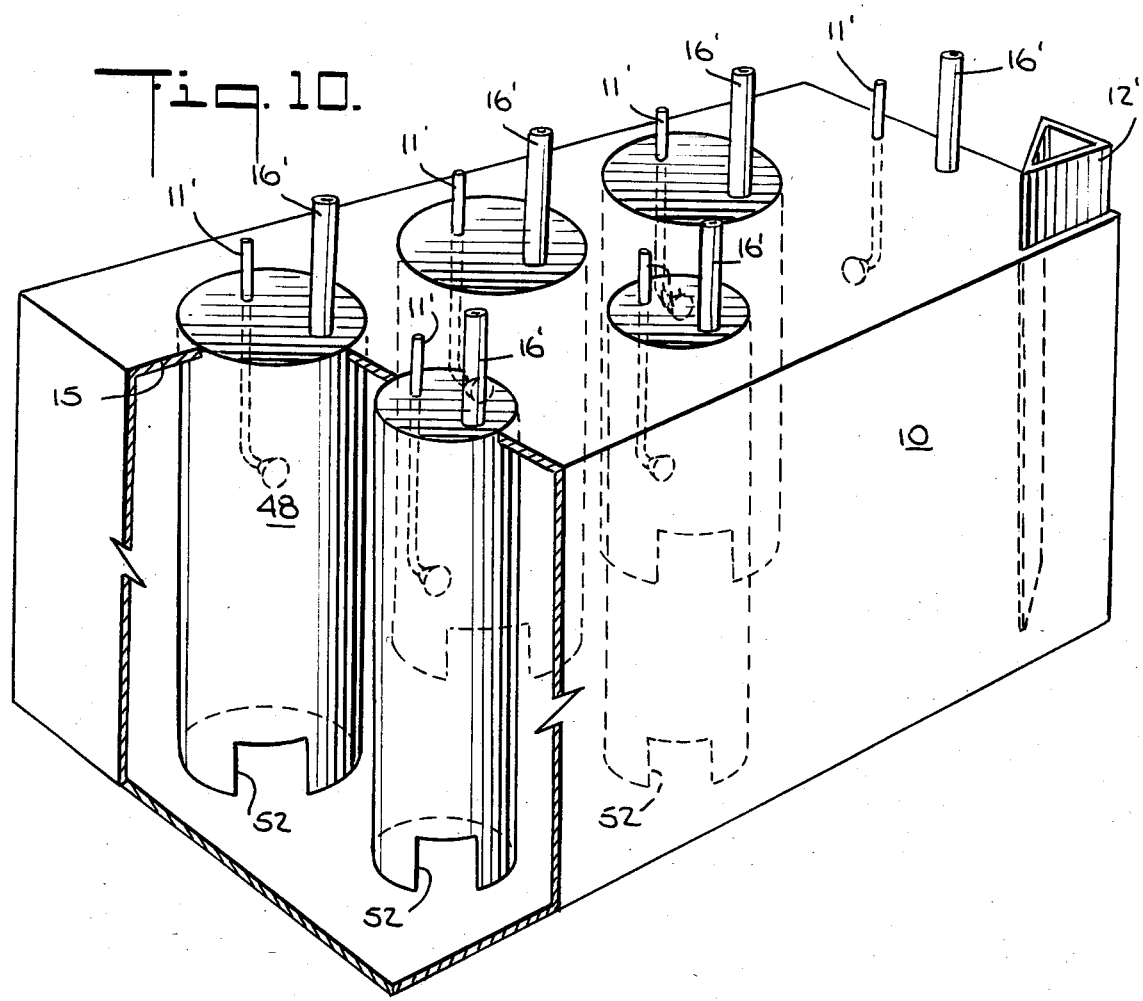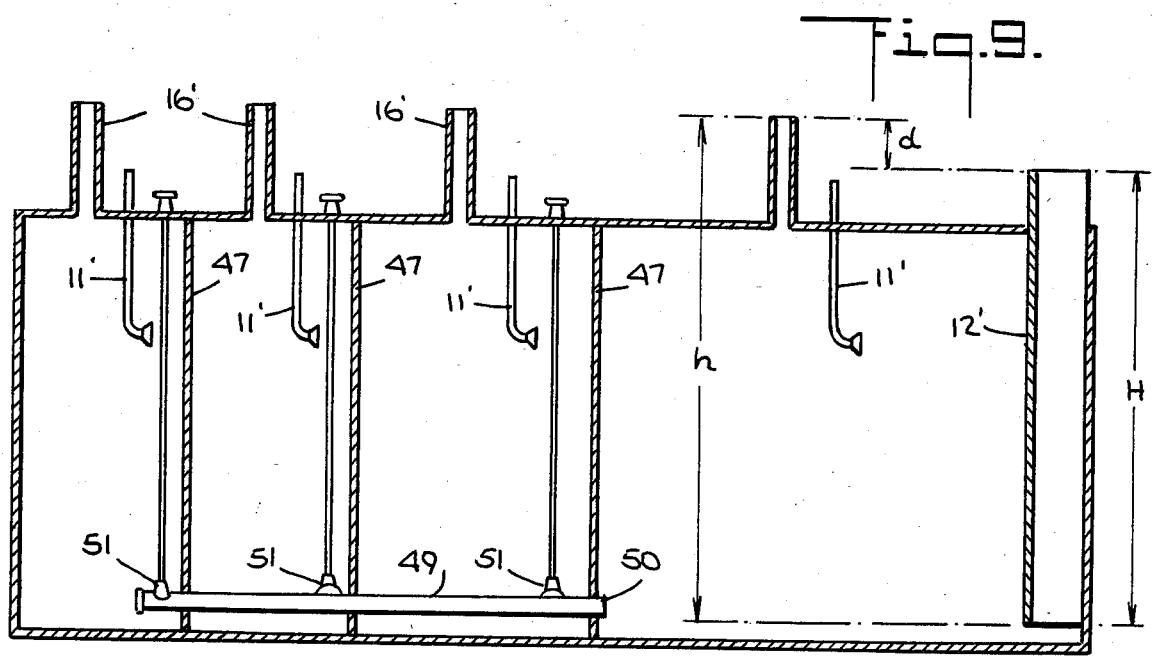

IMMISCIBLE FLUID SEPARATION APPARATUS

This application is a continuation of application Ser. No. 433,286, filed Oct. 7, 1982 which is a continuation-in-part of application Ser. No. 370,111 filed Apr. 20, 1982, both of which are now abandoned.

BACKGROUND OF THE INVENTION

1. Field of the Invention

This invention relates to an improved apparatus for separating a mixture of at least two immiscible fluids having different specific gravities.

2. Description of the Prior Art

Fluid separators in which at least two immiscible fluids are separated by the force of gravity are known in the art. See, for example, the devices described in U.S. Pat. Nos. 365,259, 405,047, 554,598, 597,258, 654,965, 757,448, 774,577, 802,243, 1,123,128, 1,159,044, 1,249,749, 1,574,157, 1,627,569, 1,716,934, 2,083,861, 2,203,718 and 3,297,537. Generally, these separators operate on the principle that a fluid of any particular specific gravity will float within or upon another fluid having a greater specific gravity, and thus separate itself from the other fluid. As a result, either fluid may be drained from the device separately from the other.

The disadvantages of previously known separators are that the rate of separation of the fluids from the mixture is relatively low, control of the off-take from the separator is inferior, and the quality of the separation is based upon time and throughput rate and varies accordingly.

SUMMARY OF THE INVENTION

It is accordingly an object of the invention to provide an improved fluid separation apparatus which overcomes the aforementioned disadvantages of prior art devices and enables more rapid separation of two immiscible fluids in a mixture with a higher purity of the separated fluids.

It is also an object of the present invention to provide an improved fluid separation apparatus which is automatic in operation, can be sized for high or low throughput rates, can efficiently handle a variety of fluids having different specific gravities, facilitates adjustment of the quality of the off-take from the apparatus, which is simple and inexpensive to construct and operate, and enables simple and inexpensive conversion of any tank to a separation apparatus.

These and other objects of the invention are achieved in a fluid separation apparatus for separating a mixture of at least two immiscible fluids having different specific gravities comprising an enclosed separation chamber, fluid intake means coupled to the separation chamber for admitting the mixture of fluids to the chamber, and first vertically-disposed elongated fluid column means extending into the chamber and opening at one end adjacent the bottom of the chamber. The opposite end of the fluid column means extends vertically above the chamber and opens exteriorly thereof for permitting the discharge from the chamber of the immiscible fluid of the mixture having the greater specific gravity. The fluid column means has a predetermined length H between the end thereof opening adjacent to the bottom of the chamber and the opposite end thereof. The apparatus also comprises a second extended fluid column means extending vertically upwardly from the chamber. The lower end of the second extended fluid column means opens into the chamber at an upper portion of the chamber, and the upper, open end thereof extends vertically above the upper end of the first extended fluid column means by a distance d which is approximately equal to $H(S_w/S_c - 1)$, where $S_w$ represents the specific gravity of the immiscible fluid having the greater specific gravity and $S_c$ represents the specific gravity of the other fluid of the mixture.

In a preferred embodiment of the invention, the first and second extended fluid column means comprise elongated tubular-shaped conduits, the first of which extends vertically downwardly either within or externally of the separation chamber. The portion of the first extended fluid column means extending vertically above the separation chamber and the second extended fluid column means preferably have cross-sectional areas which are individually at least ten times greater than the cross-sectional area of the fluid intake means of the separation chamber, and the second extended fluid column means includes means for adjusting the vertical height of its upper open end above the separation chamber with respect to the upper end of the first extended fluid column means. The apparatus may include fluid heating means, such as heating coils, disposed in the separation chamber, or pipe means including fluid obstruction means disposed in the interior of the pipe means coupled to the fluid intake means of the separation chamber. Fluid discharge means may be coupled to the upper open ends of the first and second extended fluid column means for separately discharging the immiscible fluids from the chamber. The discharge means preferably have cross-sectional areas which are approximately equal to or greater than that of the first and second extended fluid column means, respectively, and are dimensioned so as to prevent fluid back-pressure in the first and second fluid column means during discharge of the fluids from the fluid discharge means. The fluid discharge means also includes vertically inclined, downwardly extending conduit means, for discharging the fluids from the first and second extended fluid column means and the fluid discharge means. The means for adjusting the vertical height of the second extended fluid column means may comprise a slidable gate valve means, or, alternatively, a slidable pipe means.

The separation chamber of the apparatus may also include means, such as a plurality of vertical plate members or cylinders, for dividing the chamber into a plurality of sections for simultaneously separating a plurality of mixtures of immiscible fluids having different specific gravities. In this embodiment of the invention, a single first extended fluid column means extends into the separation chamber and is communicative with the plurality of sections formed in the separation chamber. A plurality of second extended fluid column means individually extend vertically upwardly from the chamber above each of the sections of the chamber formed by the dividing means. The sections of the chamber may also be interconnected by valved fluid conduits, if desired.

The invention is advantageous for land, marine or offshore applications. The apparatus of the invention enables the off-take of the separated fluids to be carried out automatically (except during start-up and final skimming), and little or no manpower is needed during operation. The off-take of both fluids should be reliable, and a variety of fluids having different specific gravities may be efficiently handled. Off-take quality control may also be pre-adjusted and readjusted during operation of the apparatus, sophisticated control equipment is not required, and operation of the device is very simple and inexpensive since the only energy utilized is the pumping of the admixture into the separation chamber and heating of the mixture when required. The apparatus is also adjustable for conditions of motion, and because the extended columns have small cross-sectional areas, a small interface area exists during the final stage of the separation process and during the skimming operation at the end of the separation process.

These and other novel features and advantages of the invention will be described in greater detail in the following detailed description.

BRIEF DESCRIPTION OF THE DRAWINGS

In the drawings, wherein similar reference numerals denote similar elements throughout the several views thereof:

FIG. 2 is a perspective view of one embodiment of a fluid discharge means which may be used in conjunction with the fluid separation apparatus of FIG. 1.

FIG. 3 is a perspective view of another embodiment of a fluid discharge means which may be used in conjunction with the fluid separation apparatus of FIG. 1.

FIG. 5 is a perspective view of still a further embodiment of a fluid discharge means which may be used in conjunction with the fluid separation apparatus of FIG. 1.

FIG. 6 is a perspective view of another embodiment of an improved fluid separation apparatus constructed according to the invention.

FIG. 7 is a cross-sectional, perspective view of one embodiment of a fluid heating means which may be used in conjunction with the improved fluid separation apparatus of the invention.

FIG. 8 is a partial cross-sectional, perspective view of another embodiment of an improved fluid separation apparatus constructed according to the invention for separating the fluids of a plurality of mixtures of immiscible fluids having different specific gravities.

FIG. 9 is a cross-sectional side view of the apparatus taken along Section 9—9 of FIG. 8.

FIG. 10 is a partial cross-sectional, perspective view of still another embodiment of an improved fluid separation apparatus constructed according to the invention for separating the fluids of a plurality of fluid mixtures.

DETAILED DESCRIPTION

Figure 1:
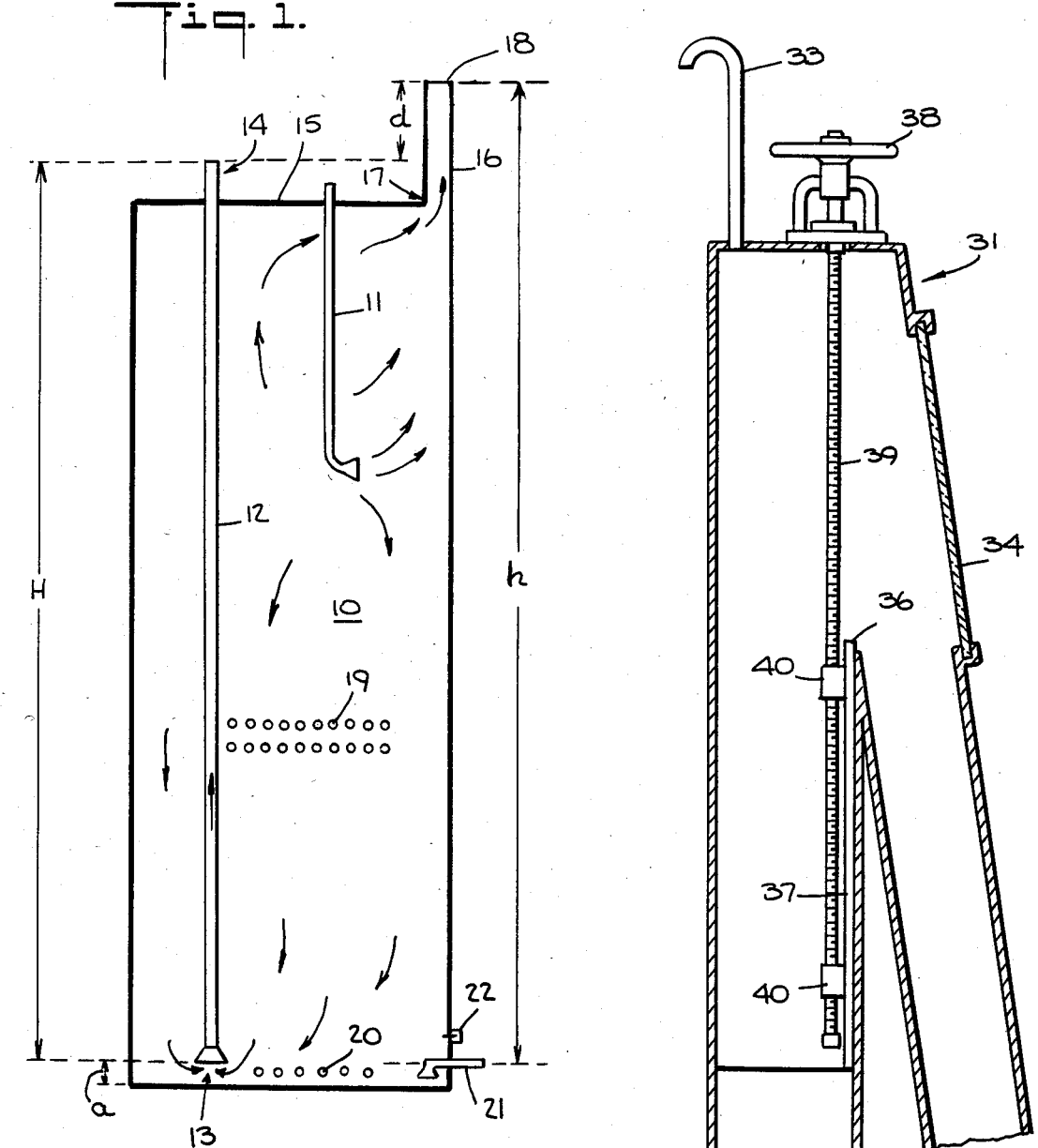
FIG. 1 is a cross-sectional view of one embodiment of an improved fluid separation apparatus constructed according to the invention.

Referring now to the drawings and in particular to FIG. 1, there is shown a fluid separation apparatus 55 which is adapted for separating a mixture of at least two immiscible fluids having different specific gravities. The apparatus includes an enclosed separation chamber 10 and a fluid intake means, illustrated as fluid intake pipe 11, coupled to the separation chamber and opening into the interior thereof for admitting the mixture of immiscible fluids to the chamber. A first vertically-disposed elongated fluid column 12, which may be of cylindrical, rectangular, triangular or any other suitable cross-sectional shape, extends into chamber 10 and opens at the lower end 13 thereof a distance a above the bottom of the chamber, for example, a distance of about 1–2 feet for a column 12 having a height of about forty feet. The opposite end 14 of column 12 extends vertically above the uppermost surface 15 of the chamber and opens exteriorly thereof in order to permit the discharge from the chamber of the fluid of the mixture which has the greater specific gravity. The column is preferably sized so that the fluid is discharged over the top edge of the column at approximately zero back-pressure. Column 12 has a predetermined length H between its lower end 13 and the upper end 14 thereof for generating a predeterminable hydrostatic pressure in separation chamber 10, and in a second column 16 described later herein. In the illustrated embodiment of the invention, column 12 extends vertically downwardly within the interior of separation chamber 10. It should be noted, however, that the column may extend vertically downward externally of the separation chamber, for example, along the chamber's outside wall, and have lower end 13 thereof coupled to and opening into the interior of chamber 10 at a point no lower than the distance a above the bottom of the chamber. In either case, the lower end 13 of column 12 is, as already mentioned, preferably disposed about 1–2 feet above the bottom of separation chamber 10. Also, the column may be fabricated either integrally or non-integrally with the separation chamber. The portion of column 12 which extends above the surface 15 preferably has a cross-sectional area which is at least about ten times greater than the cross-sectional area of the fluid intake pipe 11 of the separation chamber. That portion of the column below surface 15 preferably has a cross-sectional area which is at least six times greater than that of pipe 11.

The second column 16 extends vertically upward from the uppermost surface 15 of chamber 10 and its vertically lower end 17 opens into chamber 10 at the uppermost portion thereof. The upper end 18 of column 16 extends vertically above upper end 14 of column 12 by a distance d which is approximately equal to $H(S_w/S_c) - H$ or $$H(S_w/S_c - 1) \tag{1}$$

where $S_w$ represents the specific gravity of the immiscible fluid of the mixture having the greater specific gravity, $S_c$ represents the specific gravity of the other fluid of the mixture and H, as stated previously, represents the length of column 12 between its upper and lower ends. Similar to column 12, column 16 may be of any suitable cross-sectional shape, and also preferably has a cross-sectional area which is at least about ten times greater than the cross-sectional area of the fluid intake pipe 11. Heating means, such as heating coils 19, may be disposed in the separation chamber to increase the separation rate when the fluid mixture includes heavy crude oils or similar fluids. Coils 19 are preferably located at a distance above the bottom of chamber 10 which is between approximately ⅓ and ½ of the vertical height of the separation chamber. Additional heating coils 20 may be disposed adjacent the bottom of separation chamber 10 to facilitate tank cleaning and repair. Heating coils 19 preferably are constructed so as to provide a ratio of approximately one square foot of their surface area for each eighty cubic feet of the volume of the separation chamber. Separation chamber 10 may also be provided with a bottom suction and filling line 21 for initial partial filling of the heavier gravity liquid and for the purpose of tank cleaning, and a probe 22 connected to a suitable detection device may be extended into the chamber for detecting traces of the lighter one of the immiscible fluids of the mixture, e.g., oil, and thereby triggering an alarm device.

Referring now to FIG. 2, a fluid removal means, illustrated as an off-take or discharge structure 23, is coupled to the open upper end 14 of column 12. The off-take structure is, in the illustrated embodiment of the invention, rectangular in shape and is sized so as to have approximately zero back-pressure at full rated flow of the separated fluid from column 12. When such an off-take structure is utilized in conjunction with column 12, the height H between the lower and upper ends 13 and 14 of column 12 is measured from lower end 13 to the edge 24 of a rectangular-shaped opening 25 provided in off-take structure 23. Structure 23 includes a downwardly inclined conduit 26 whose interior 27 is coupled to a discharge pipe or the like and from which the fluid in column 12 is discharged and transferred from the separation tank during operation of the apparatus. Since the equilibrium of the separator's operation is based on the level of edge 24, the fluid in column 12 should be maintained at this approximate level during the separation process. Therefore, a separate small feed line (not shown) for the supply of the heavier gravity fluid should be coupled to column 12 with an automatic float valve to maintain a level of the fluid in the column just below the edge of upper end 14 in the event the fluid falls below this level. The off-take structure also includes a vent 28, a liquid level sightglass 29 coupled to the interior thereof, and a glass inspection plate 30 for permitting viewing of the interior of off-take structure 23.

Figure 4:
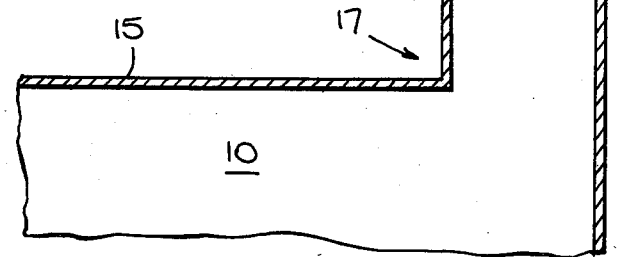
FIG. 4 is a partial, cross-sectional view of the fluid discharge means illustrated in FIG. 3, taken along section 4—4.

As shown in FIGS. 3 and 4, column 16 may also be provided with an off-take or discharge structure 31 which is similar to off-take structure 23 coupled to column 12 and is dimensioned so as to have approximately zero back-pressure at full rated flow of the separated fluid from column 16. Off-take structure 31 is rectangular in shape and has a liquid level sightglass 32, a vent 33, a glass inspection plate 34, and a vertically inclined downwardly extending discharge conduit 35 for discharging liquid from column 16. Off-take structure 31, unlike structure 23, has an upper edge 36 which is vertically adjustable. This edge is part of a slidable gate valve comprising a rectangular plate 37 which is slidably disposed within off-take structure 31 and is movable by means of a valve wheel 38 coupled to plate 37 by a threaded, non-rising stem 39. Stem 39 threadably engages threaded openings provided in outwardly extending coupling members 40 attached to the inner surface of slidable plate 37. This construction permits plate 37, and the height of edge 36 relative to edge 24 of off-take structure 23, to be raised or lowered vertically to adjust the discharge flow of fluid from column 16. Off-take structure 31 is preferably designed so that the lowermost position of the edge 36 of plate 37 is slightly below the vertical height of upper edge 24 of off-take structure 23. Alternatively, the discharge structure may be cylindrical in shape, as shown in FIG. 5, and instead of a slidable gate valve, include a slidable pipe gate comprising a cylindrical pipe 37' slidably disposed within the cylindrical off-take structure.

The separator of the invention operates on the principle that a column of fluid will support a contained fluid of a lesser specific gravity, with which it is immiscible, so that its vertically upper surface is located at a distance above the upper surface level of the fluid of greater specific gravity and which is relative to the height of the column of the fluid of greater specific gravity and the differential in specific gravities of the fluids. Thus, in operation of the apparatus of the invention, the hydrostatic pressure generated by the heavier fluid in column 12 provides predeterminable parameters for the height of the lighter fluid in column 16.

The height h to which the fluid in column 16 will rise above the lower end of column 12 during operation of the apparatus is given by the equation $$H(S_w/S_c) \qquad (2),$$

where H is the height of column 12 between its lower end 13 and upper end 14 (or in the case where off-take structure 23 is used, between lower end 13 and edge 24), $S_w$ represents the specific gravity of the fluid having the greater specific gravity, and $S_c$ represents the specific gravity of the fluid having the lesser specific gravity. Similarly, the height h the fluid in column 16 above the upper end of column 12 is given by the equation $$H(S_w/S_c - 1), \qquad (3),$$

which, as can be readily seen, is the distance d given by equation (1).

The foregoing equations will be useful to determine the height of column 16 for optimal operating conditions. In practical use of the apparatus, however, depending upon whether the apparatus is stationary or non-stationary, the value of H in equations (1), (2) and (3) above should be reduced since the zone of admixed fluids in the separation chamber will effectively decrease the height of column 12. In order to provide a safety margin for stationary separators, H is preferably reduced by a factor of about 0.25, and the equation for finding the distance d becomes $$(0.75H)(S_w/S_c - 1) \qquad (4).$$

For non-stationary separators, H is preferably reduced by a factor of about 0.40, and d is given by $$(0.6H)(S_w/S_c - 1) \qquad (5).$$

For example, if the height H of column 12 is 40 feet, the separator is to be stationary, and the admixture fed to the separator is a mixture of seawater (specific gravity 1.025) and light fuel oil (specific gravity 0.925), the distance d is given by the equation $$0.75(30)(1.025/0.925 - 1) = 3.24 \text{ feet.}$$

It should be noted, however, that since the dimensions of the separation chamber, the specific gravities of the fluids contained in the admixture, and, in the case of non-stationary separators, the type and magnitude of motion to which the apparatus will be subjected, will vary, the foregoing factors are exemplary only. Once the height of the fluid in column 16 above column 12 is determined by the appropriate equation, the upper end 18 of column 16 (or edge 36 of off-take structure 31) above the upper end 14 of column 12 (or edge 24 of off-take structure 23) is set in a position within the distance d above the upper end of column 12 according to the purity of the fluid discharge desired, the purity of the fluid discharge decreasing as the upper end of column 16 (or the upper end of off-take structure 31) is moved downwardly and increasing as it is moved upwardly. When this is done, the separator will operate automatically and provide a continuous flow of the separated fluids from columns 12 and 16 as the admixture is admitted to separation chamber 10 by the intake pipe 11.

The embodiment of the invention illustrated in FIGS. 1 through 5 is particularly advantageous for maritime use, such as on oil tankers and other vessels used for the transportation of petroleum products, although it is also applicable to land applications. In marine use, the separator can be utilized to separate crude oils, petroleum products, some waste products, and vegetable oils from seawater. Since this essentially requires only one separation operation, even though several products of different specific gravity may be processed in a comingled state, discharge is simplified.

In maritime applications, as well as land applications, the efficiency of the apparatus will increase as the height of column 12 becomes greater. Thus, marine vessels, ships and tankers, which have hull depths of up to about 110 feet, are particularly suitable for use with this apparatus. The following examples illustrate the degree of increased efficiency achieved when the height of column 12 is greater for different mixtures of immiscible fluids:

| H | d |
|---|---|
| A. Mixture of Seawater (Specific Gravity 1.025) and Heavy Fuel Oil (Specific Gravity .96): | |
| 40 feet | 2.7 feet |
| 80 feet | 5.42 feet |
| B. Mixture of Seawater and Light Fuel Oil (Specific Gravity .925): | |
| 40 feet | 4.3 feet |
| 80 feet | 8.65 feet |
| C. Mixture of Seawater and Naphtha (Specific Gravity .80) | |
| 40 feet | 11.25 feet |
| 80 feet | 22.5 feet |

The preferred height for column 12 for marine use is 40 feet or more, when the differential in specific gravities of the two fluids in the admixture is small (for example, seawater and heavy fuel oil), although it may be considerably less if the differential in specific gravity is large as in example C above.

The height of column 12, the cubic volume of the separation chamber, fluid viscosities, differential between the specific gravities of the fluids of the mixture, and the required off-take purity (the quality of separation will be improved by using the highest off-take operable) are the main elements in determining optimum separation flow rates.

Prior to commencing operation of the apparatus, separation chamber 10 should be approximately two-thirds full with the fluid of greater specific gravity. For example, where a mixture of heavy fuel oil and seawater is to be separated, the chamber is filled to approximately two-thirds of its height with seawater. At this time, the column 12 will contain only seawater. The height of column 16 is then determined using the appropriate one of the equations set forth previously herein. If the separation apparatus is designed as described with reference to FIGS. 2 through 5, manual wheel 38 is turned to adjust the height of edge 36 so that the distance between edge 24 of off-take structure 23 and edge 36 of off-take structure 31 is approximately equal to or less than the distance d calculated using the applicable equation. The admixed fluids are then admitted to chamber 10, and as the fluids are subjected to the force of hydrostatic pressure and buoyancy within the chamber, the fluid of lesser specific gravity (e.g., the fuel oil) will separate from the fluid of greater specific gravity (the seawater) and will be displaced upwardly by hydrostatic pressure and positive buoyancy, while the heavier fluid will basically be displaced downwardly by the force of gravity and the juxtaposition of the lighter gravity fluid. As the chamber continues to fill, the fluids are continuously separated by these forces. When the fluids in the chamber occupy its entire volume, the separated fluids rise within the columns. As the admixed fluids continue to be admitted to the chamber, the separated fluids will be discharged from columns 12 and 16, the fluid of greater specific gravity being discharged from column 12 and the fluid of lower specific gravity being discharged from column 16, all automatically and continuously as the mixture of fluids is admitted to chamber 10. The fluid in column 12, as previously mentioned, produces hydrostatic pressure in separation chamber 10 and column 16 which pressurizes the chamber and column 16 and enhances the entire separation process, particularly by improving separation at the upper and lower ends of the separating zone in the separation chamber 10 and in column 16 and increasing the differential in fluid heights in columns 12 and 16, which permits automatic, controlled separation (i.e., with respect to purity) of the fluids. Continuous flow of the liquids separately, and with a controllable quality of purity, is achieved with this arrangement.

It should be noted that although not shown or described herein, the apparatus may include an access hatch and ladder, a tank cleaning system and an inert gas system, if required.

Marine vessels of small depths, such as barges, tugboats, offshore supply boats, and particularly oil pollution clean-up vessels, as well as land rolling and stationary equipment with small depths, such as tank trucks, railroad tankers, liquid containers, small tanks, etc., may be constructed or retrofitted with the separation apparatus of the invention by adding either permanent or portable extended columns with off-take structures as described previously herein, or by simply using the required lengths of piping as determined by the appropriate equation.

FIG. 6 illustrates another embodiment of the invention which is particularly adapted for land use and comprises a truck tanker 40', which serves as the separation chamber, and a pair of vertical columns 41 and 42 corresponding to columns 12 and 16 in the embodiment of the invention illustrated in FIG. 1. To facilitate discharge of the separated fluids, the columns have downwardly inclined conduit portions 43 and 44 similar to those of the rectangular-shaped off-take structures 23 and 31 in FIGS. 2 and 3. The height of column 42 relative to the vertical uppermost portion of column 41 is determined by using the appropriate one of the equations set forth previously herein. Both columns are, in the illustrated embodiment of the invention, fabricated of pipes having a fixed length to provide automatic off-take of the separated fluids. In all other respects, the operation of such a separation apparatus is the same as those embodiments of the invention previously described herein.

As can be readily seen, any size tank may be constructed as a fluid separator, and the process rate thereof will be relative to the volume of the separation chamber, the differential between the specific gravities of the fluids comprising the mixture, and the height of the column used to discharge the fluid of greater specific gravity.

FIG. 7 illustrates an alternate means for heating the admixed fluids to be separated in the apparatus, instead of the heating coils previously described herein. Since small vessels and equipment frequently do not have any means of supplying heat to the fluid mixture, but generally always have some means for pumping, the mixture may be admitted to the separation chamber through piping 45 which includes a plurality of obstructions 46 disposed on its inner walls. As the fluid is pumped through such piping, the obstructions generate frictional heat as a result of the contact between the fluid and the obstructions, thereby heating the fluid and facilitating separation. Such piping would either comprise or be coupled to the fluid intake conduit of the separation apparatus so as to heat the mixture prior to admission to the separation chamber. Any such piping should be insulated unless it is mounted within the separation chamber, and its length will depend upon the temperature rise required by the fluid mixture. Such piping may be constructed by cutting pipe lengths in half longitudinally, welding the obstructions to the inner wall in each half of the pipe, and then rewelding the split halves, or by making transverse cuts in the piping, inserting the obstructions, then welding the slits closed. Such piping could also be used for normal vessel operations, and particularly during start-up operations at sea or in port, or during breakdown of a vessel's cargo or fuel oil heating system. Several lengths of such piping can be mounted on deck, in tanks, in the pump room or elsewhere in the vessel.

FIGS. 8 through 10 illustrate further embodiments of the invention in which separation chamber 10 is divided into a plurality of sections by a plurality of, for example, vertically-disposed plate members 47 or cylinders 48 disposed in parallel relationship within the chamber, and extending downwardly from uppermost surface 15 to the bottom of the chamber. One of a plurality of fluid intake pipes 11' are disposed in each of the sections of the chamber formed by the plate members and cylinders for individually admitting a plurality of mixtures of immiscible fluids to the sections of the chamber, each of which consists of at least two immiscible fluids having different specific gravities. A single first extended fluid column 12' located in one of the sections formed by the plate members and cylinders (a primary chamber section) extends downwardly into the separation chamber, similar to column 12 described with reference to FIG. 1. The cross-sectional area of column 12' in this embodiment of the chamber is preferably approximately six times greater than the total cross-sectional area of fluid intake pipes 11' for that portion of column 12' disposed below uppermost surface 15 of the chamber, and approximately ten times the total cross-sectional area of the inlets for that portion of the column extending above the top surface of the chamber. A plurality of second extended fluid columns 16' extend upwardly from uppermost surface 15 of the separation chamber. One of each of these columns is disposed over a respective section of the chamber and each is individually dimensioned with respect to column 12' in the same manner as column 16 described previously with respect to FIG. 1, including having a cross-sectional area which is preferably approximately ten times greater than the cross-sectional area of the fluid intake pipe 11' connected to the section over which the column is disposed, except that $S_w$ in equation (3) above will represent the specific gravity of the immiscible fluid of the mixture admitted to each respective section of chamber 10 which has the greater specific gravity, and $S_c$ will represent the specific gravity of the other of the fluids of the mixture admitted to each of the sections of the separation chamber. Each of the sections of the chamber formed by the plate members and cylinders form separate fluid separating units within the chamber which function independently, with the exception of the fluid in column 12' which has the heaviest specific gravity. The number, size and shape of the sections of the chamber can also be varied as required.

As shown in FIGS. 8 and 9, as previously explained, plate members 47 extend downwardly from surface 15 to the bottom of the separation chamber 10. The respective sections of the chamber formed by these members are interconnected by a fluid conduit or pipe 49. The conduit includes a plurality of branches or extensions 50 opening and extending into each respective section for permitting the flow of the immiscible fluid of the mixture admitted to each respective section of chamber 10 having the greater specific gravity between the sections of the chamber. Valves 51 may be individually coupled to one or more of extensions 50 for controlling the flow of the greater specific gravity fluid between the sections of the chamber. Valves 51 permit the sections of the chamber to be individually isolated from the remaining sections during the separation process, if desired, to enable, for example, cleaning or repair of the sections. The flow of the fluid mixture to any section of the chamber through the fluid intake pipe 11' coupled thereto which is isolated from the remaining sections during fluid separation would, of course, have to be terminated. Similar to the separation distance for the lower end of column 12', the valves and conduit are preferably located approximately 1 to 2 feet above the bottom of the chamber for a column having a height of about forty feet. It also should be noted that although pipe 49 has been illustrated as having one end open to the primary section of chamber 10 a valve similar to valves 51 could also be coupled to this end to enable simultaneous control of the flow of the heaviest specific gravity fluid into the primary chamber section and column 12' from the remaining sections of the chamber. Pipe 49 could also include an extension coupled to a pump outside the separation chamber for suction and discharge purposes, if desired As shown in FIG. 10, cylinders 48 extend downwardly to the bottom of the separation chamber and each includes at least one aperture 52 disposed at its vertically lower end to permit the flow of the greater specific gravity fluid of the mixture admitted to each respective section formed by the cylinders between at least two of the sections of the chamber (i.e., between at least each of the cylinders and the primary section formed by the separation chamber 10 outside of the individual cylinders).

It should be noted that plate members 47 and cylinders 48 could, if desired, be constructed so as to extend downwardly to a point adjacent and spaced apart from the bottom of the chamber. In such a construction, the spaces below the bottom of the plate members or cylinders would permit the individual sections to be communicative with each other within the separation chamber. It also should be noted that although the separation chamber has been illustrated as having a rectangular shape and a flat uppermost surface 15, that the latter surface could also comprise a dome disposed over the chamber. Also, where a large differential in specific gravity exists between the fluids of a mixture being separated, a simple gooseneck type offtake structure may be used as the fluid offtakes from columns 16' of each respective section of the chamber and/or column 12' (see, for example, conduit portions 43 and 44 of the embodiment of the apparatus illustrated in FIG. 6).

The advantage of this embodiment of the invention is that it enables the separation of a common fluid, such as water, from a plurality of mixtures of immiscible fluids, such as water and crude oil and other petroleum products, either separately or all at the same time. Since only one first extended fluid column is required, it can be readily seen that the plurality of separating sections which are formed in the separation chamber will be simple and less expensive to construct and maintain. In all other respects, the operation of this embodiment of the fluid separation apparatus is the same as that described in FIGS. 1 through 7 herein. It should also be understood that although some may not be illustrated in FIGS. 8–10, any features of those embodiments of the invention described with reference to FIGS. 1–7 may also be utilized in the embodiments of FIGS. 8–10.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A fluid separation apparatus for separating a mixture of at least two immiscible fluids having different specific gravities, comprising:

an enclosed separation chamber having its volume entirely full with at least two immiscible fluids, fluid intake means, coupled to said separation chamber, for admitting said mixture of fluids to said chamber, first vertically-disposed, elongated fluid column means extending into said chamber and opening at one end adjacent the bottom thereof, the opposite end of said fluid column means extending vertically above the top of said chamber and opening exteriorly thereof above the top of said chamber for permitting the discharge from said chamber of the immiscible fluid of said mixture having the greater specific gravity, said fluid column means having a predetermined length H between the end thereof opening adjacent to said bottom of said chamber and said opposite end thereof and wherein said first fluid column means is completely filled from said opening adjacent to said bottom to said opposite end defined by H with said fluid having the greater specific gravity to produce a hydrostatic head for effecting the separation and wherein said first fluid column means has no fluid communication opening intermediate said one end and said opposite end, second extended fluid column means extending vertically upwardly from the top of said chamber, a lower end of said second extended fluid column means opening into said chamber at an upper portion of said chamber, and an upper, open end thereof extending vertically above said opposite end of said first extended fluid column means by a distance d which is approximately equal to $H(S_w/S_c - 1)$, where $S_w$ represents the specific gravity of said immiscible fluid having the greater specific gravity and $S_c$ represents the specific gravity of the other of said fluids of said mixture and wherein said second fluid column means is completely filled with said other fluids between said lower end and said upper end as defined by d and wherein said second fluid column means has no fluid communication opening intermediate said lower end and said upper end, means for adjusting d responsive to H, $S_w$ and $S_c$ for controlling the quality of the separation, first fluid discharge means coupled to said open, opposite end of said first fluid column means for discharging said fluid of the greater specific gravity from said first fluid column means at approximately zero back pressure, second fluid discharge means coupled to said upper, open end of said second fluid column means for discharging said other fluids from said second fluid column means at approximately zero back pressure.

2. The apparatus recited in claim 1, wherein said first and second extended fluid column means comprise elongated tubular-shaped conduits.

3. The apparatus recited in claim 1, wherein said first extended fluid column means extends vertically downward within said separation chamber.

4. The apparatus recited in claim 1, wherein said first extended fluid column means extends vertically downward externally of said separation chamber.

5. The apparatus recited in claim 1, wherein the portion of said first extended fluid column means extending vertically above said separation chamber and said second extended fluid column means have cross-sectional areas which are at least about ten times greater than the cross-sectional area of said fluid intake means of said separation chamber.

6. The apparatus recited in claim 1, wherein said second extended fluid column means includes means for adjusting the vertical height of said upper, open end of said second fluid column means above said separation chamber with respect to said opposite end of said first extended fluid column means.

7. The apparatus recited in claim 1, further comprising means, disposed in said separation chamber, for heating said fluids in said chamber.

8. The apparatus recited in claim 7, wherein said fluid heating means comprises heating coils disposed in said chamber.

9. The apparatus recited in claim 7, wherein said fluid heating means comprises pipe means, including fluid obstruction means disposed in the interior of said pipe means, coupled to said fluid intake means of said separation chamber.

10. The apparatus recited in claim 1, wherein said first and second fluid discharge means have a cross-sectional area which is approximately equal to or greater than said first and second extended fluid column means respectively.

11. The apparatus recited in claim 10, wherein said fluid discharge means include vertically inclined, downwardly extending conduit means for discharging said fluids from said first and second extended fluid column means and said discharge means.

12. The apparatus recited in claim 6, wherein said means for adjusting the vertical height of said second extended fluid column means comprises slidable gate valve means.

13. The apparatus recited in claim 6, wherein said means for adjusting the vertical height of said second extended fluid column means comprises slidable pipe means.

14. The apparatus recited in claim 1, wherein said separation chamber further includes means, extending downwardly into said chamber, for dividing said chamber into a plurality of separate sections, said sections being communicative with each other within said separation chamber; wherein said second extended fluid column means comprises a plurality of second extended fluid column means, at least one of said plurality of second extended fluid column means extending vertically upwardly above each of said sections of said chamber; and wherein said fluid intake means comprises a plurality of fluid intake means, at least one of said plurality of fluid intake means extending downwardly into each of said sections of said chamber for admitting a plurality of said mixtures of at least two immiscible fluids to said sections of said separation chamber, the upper open end of each of said plurality of second extended fluid column means extending vertically above said opposite end of said first extended fluid column means by a distance d which is approximately equal to $H(S_w/S_c - 1)$, where $S_w$ represents the specific gravity of said immiscible fluid of the mixture admitted to each respective section of said chamber having the greater specific gravity, and $S_c$ represents the specific gravity of the other of said fluids of said mixture admitted to each of said sections of said chamber.

15. The apparatus recited in claim 14, wherein said chamber includes a single first extended fluid column means extending into one of said sections of said chamber.

16. The apparatus recited in claim 14, wherein said dividing means comprises a plurality of vertical plate members disposed in spaced-apart, parallel relationship within said separation chamber.

17. The apparatus recited in claim 16, wherein said plate members extend downwardly into said chamber to the bottom thereof, and wherein said separation chamber further comprises means, coupled to each of said plurality of sections of said chamber, for permitting the flow of said immiscible fluid of the mixture admitted to each respective section of said chamber having the greater specific gravity between said sections of said chamber.

18. The apparatus recited in claim 17, wherein said means for permitting the flow of said greater specific gravity fluid between said sections of said chamber comprises fluid conduit means extending through said plate members in said chamber and communicative with each of said sections of said chamber.

19. The apparatus recited in claim 18, further comprising valve means, coupled to said fluid conduit means, for controlling the flow of said greater specific gravity fluid between said sections of said chamber.

20. The apparatus recited in claim 14, wherein said dividing means comprises a plurality of vertical, cylindrical members disposed in spaced-apart relationship within said separation chamber.

21. The apparatus recited in claim 20, wherein said cylindrical members extend downwardly into said chamber to the bottom thereof and include at least one aperture means disposed at the vertically lower end of each of said members for permitting the flow of said immiscible fluid of the mixture admitted to each respective section of said chamber having the greater specific gravity between at least two of said sections of said chamber.

* * * * *